United States Patent
Horvath et al.

(10) Patent No.: US 10,440,196 B2
(45) Date of Patent: *Oct. 8, 2019

(54) DEVICES AND METHODS FOR ENHANCED IMAGE CAPTURE OF DOCUMENTS

(71) Applicant: The Toronto-Dominion Bank, Toronto (CA)

(72) Inventors: Peter Horvath, Toronto (CA); Eric Paul Kaiser, Jr., Auburn, ME (US); Steven Gervais, Newmarket (CA); John Jong-Suk Lee, Toronto (CA); Arun Victor Jagga, Toronto (CA)

(73) Assignee: The Toronto-Dominion Bank, Toronto, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,804

(22) Filed: Nov. 30, 2018

(65) Prior Publication Data

US 2019/0109951 A1  Apr. 11, 2019

Related U.S. Application Data

(63) Continuation of application No. 15/726,429, filed on Oct. 6, 2017, now Pat. No. 10,178,246.

(51) Int. Cl.
*G06K 9/00* (2006.01)
*H04N 1/00* (2006.01)
(Continued)

(52) U.S. Cl.
CPC ....... *H04N 1/00129* (2013.01); *G06F 17/241* (2013.01); *G06K 9/00449* (2013.01); *G06K 9/00463* (2013.01); *G06T 11/00* (2013.01); *G06T 11/60* (2013.01); *H04N 1/19594* (2013.01); *H04N 1/32106* (2013.01); *H04N 5/23229* (2013.01); *H04N 5/23293* (2013.01);
(Continued)

(58) Field of Classification Search
CPC combination set(s) only.
See application file for complete search history.

(56) References Cited

U.S. PATENT DOCUMENTS 5,040,227 A  8/1991  Lyke et al.
8,155,425 B1  4/2012  Mandel
(Continued)

OTHER PUBLICATIONS

Notice of Allowance dated Oct. 1, 2018 for U.S. Appl. No. 15/726,429.
(Continued)

*Primary Examiner* — Alex Kok S Liew
(74) *Attorney, Agent, or Firm* — Rowand LLP

(57) ABSTRACT

A computer-implemented method for processing images of a document is disclosed. The method includes: capturing an image of at least part of a document by a camera of an electronic device, the document having one or more data fields; determining, by the electronic device, one or more data entry items from analyzing the one or more data fields in the image; and displaying, on a display of the electronic device, a live view image of the document with annotation overlays on the live view image, each annotation overlay containing a respective one of the one or more data entry items and being displayed in association with its respective data field in the live view image.

20 Claims, 9 Drawing Sheets

(51) Int. Cl.
*H04N 1/195* (2006.01)
*H04N 5/232* (2006.01)
*G06F 17/24* (2006.01)
*G06T 11/60* (2006.01)
*H04N 1/32* (2006.01)
*G06T 11/00* (2006.01)
*H04N 5/272* (2006.01)

(52) U.S. Cl.
CPC ......... *H04N 5/272* (2013.01); *G06K 2209/01* (2013.01); *H04N 2201/0084* (2013.01)

(56) References Cited

U.S. PATENT DOCUMENTS

| | | | |
|---|---|---|---|
| 8,162,125 B1* | 4/2012 | Csulits | G07D 7/12 |
| | | | 194/206 |
| 8,704,948 B2 | 4/2014 | Mountain | |
| 2005/0223315 A1* | 10/2005 | Shimizu | G06F 17/241 |
| | | | 715/230 |
| 2009/0059094 A1* | 3/2009 | Yi | G09B 5/06 |
| | | | 348/744 |
| 2009/0141962 A1 | 6/2009 | Borgia et al. | |
| 2014/0112571 A1 | 4/2014 | Viera et al. | |

OTHER PUBLICATIONS

U.S. Office Action dated Jan. 24, 2019, U.S. Appl. No. 16/223,860.

* cited by examiner

DEVICES AND METHODS FOR ENHANCED IMAGE CAPTURE OF DOCUMENTS

RELATED APPLICATIONS

This application claims priority to U.S. patent application Ser. No. 15/726,429 filed on Oct. 6, 2017, the entirety of which is incorporated herein by reference.

TECHNICAL FIELD

The present disclosure relates to user interfaces and, in particular, to managing user interfaces of image capture applications on an electronic device.

BACKGROUND

Electronic devices may be utilized to capture and process various types of images. For example, mobile devices with cameras can be used to capture images of documents, such as identity cards, receipts, cheques, tickets, and coupons, which can subsequently be saved on the devices or further processed to identify information contained in the documents. Where hard copies of documents are not required, the digitization (by image capture) of documents can be a convenient and secure way of managing documents. Accordingly, it would be beneficial to provide user interfaces that facilitate effective capture and processing of images of documents on electronic devices.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
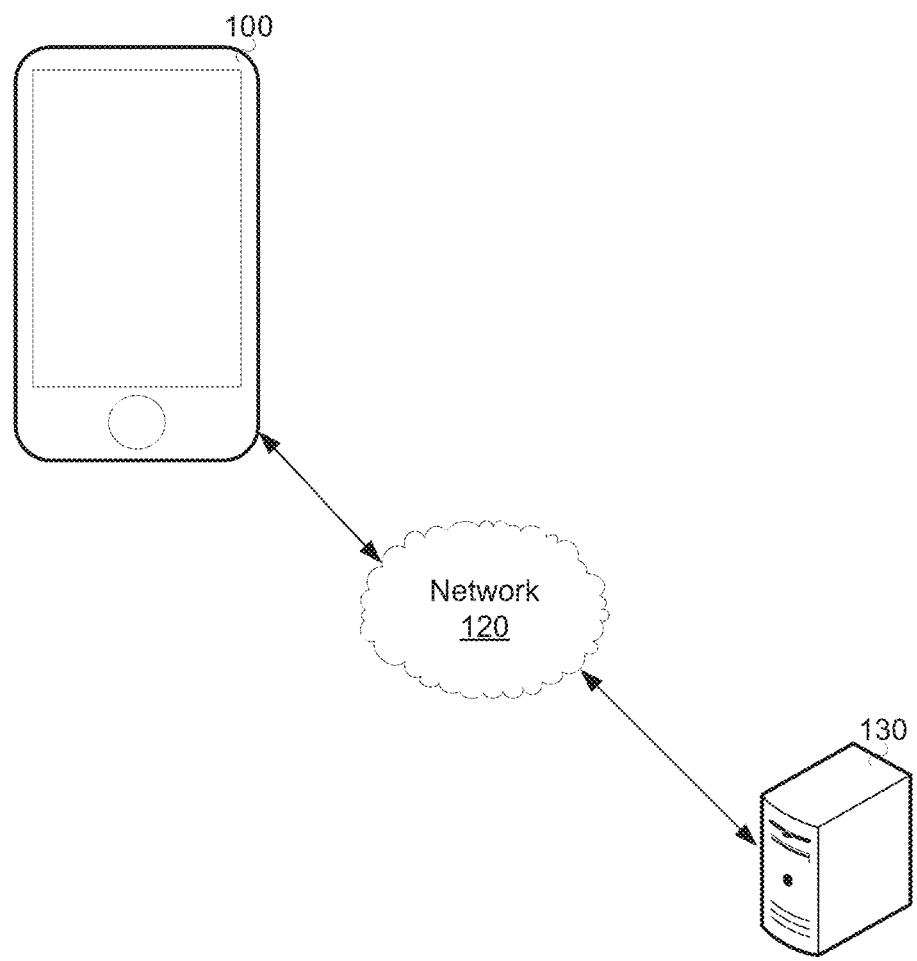
FIG. 1 is a schematic operation diagram illustrating an operating environment of an example embodiment.

In one aspect, the present disclosure describes an electronic device. The electronic device includes a display, a camera, a memory storing an image capture application module, and a processor coupled to the display, the camera, and the memory. The processor is configured to: receive an image of at least part of a document captured by the camera, the document having one or more data fields; determine one or more data entry items from analyzing the one or more data fields in the image; and display, on the display, a live view image of the document with annotation overlays on the live view image, each annotation overlay containing a respective one of the one or more data entry items and being displayed in association with its respective data field in the live view image.

In another aspect, the present disclosure describes a computer-implemented method comprising: capturing an image of at least part of a document by a camera of an electronic device, the document having one or more data fields; determining, by the electronic device, one or more data entry items from analyzing the one or more data fields in the image; and displaying, on a display of the electronic device, a live view image of the document with annotation overlays on the live view image, each annotation overlay containing a respective one of the one or more data entry items and being displayed in association with its respective data field in the live view image.

In another aspect, the present disclosure describes a non-transitory computer-readable storage medium comprising processor-executable instructions which, when executed, configure a processor to: receive an image of at least part of a document captured by a camera of an electronic device, the document having one or more data fields; determine one or more data entry items from analyzing the one or more data fields in the image; and display, on a display of the electronic device, a live view image of the document with annotation overlays on the live view image, each annotation overlay containing a respective one of the one or more data entry items and being displayed in association with its respective data field in the live view image.

Other example embodiments of the present disclosure will be apparent to those of ordinary skill in the art from a review of the following detailed descriptions in conjunction with the drawings.

The present disclosure provides techniques of generating user interfaces for image capture applications. More specifically, methods are provided for displaying live view images of documents which are annotated using data entry items that are extracted from the imaged documents. Exemplary user interfaces of image capture applications display live previews of documents with annotation overlays that contain textual data imprinted on the documents. Such exemplary user interfaces as disclosed herein can facilitate real-time editing and/or verification of annotated data for a document, and may, as a result, allow for reducing the amount of processing required prior to submission/transmission of data extracted from the document. For example, the concurrency of display of live view image of a document and annotation overlays may reduce the total number of user interface screens that are displayed as part of a data submission/transmission process in a software application.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

It should be noted that while the following description presents embodiments relating to a specific type of document, namely bank cheques, the devices and methods for processing images of documents, as disclosed herein, are applicable more generally to a wide array of different types of documents containing typed, handwritten, and/or printed material.

FIG. 1 is a schematic operation diagram illustrating an operating environment of an example embodiment.

The electronic device 100 may perform data transfers with other computing devices via a network 120. For example, as illustrated, the electronic device 100 may transfer data to/from a server 130 via the network 120.

The electronic device 100 is a computer system. In some embodiments, the electronic device 100 may be a portable electronic device. For example, the electronic device 100 may, as illustrated, be a smartphone. However, the electronic device 100 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In certain embodiments, the electronic devices may be associated with one or more users. For instance, a user may operate the electronic device, and may do so to cause the electronic devices to perform one or more operations consistent with the disclosed embodiments. In some embodiments, the electronic device 100 may include a smart card, chip card, integrated circuit card (ICC), and/or other card having an embedded integrated circuit.

The server 130 is a computer system. The server 130 may be, for example, a mainframe computer, a minicomputer, or the like. The server 130 may include one or more computing devices. For example, the server 130 may include multiple computing devices such as, for example, database servers, compute servers, and the like. The multiple computing devices may be in communication by a network such as, using the network 120. In another example, the multiple computing devices may communicate using another network such as, for example, a local-area network (LAN). In some embodiments, the server 130 may include multiple computing devices organized in a tiered arrangement. For example, server 130 may include middle-tier and back-end computing devices. In some embodiments, server 130 may be a cluster formed of a plurality of interoperating computing devices.

The network 120 is a computer network. The network 120 allows computer systems in communication therewith to communicate. For example, as illustrated, the network 120 may allow the electronic device 100 to communicate with the server 130.

Figure 2:
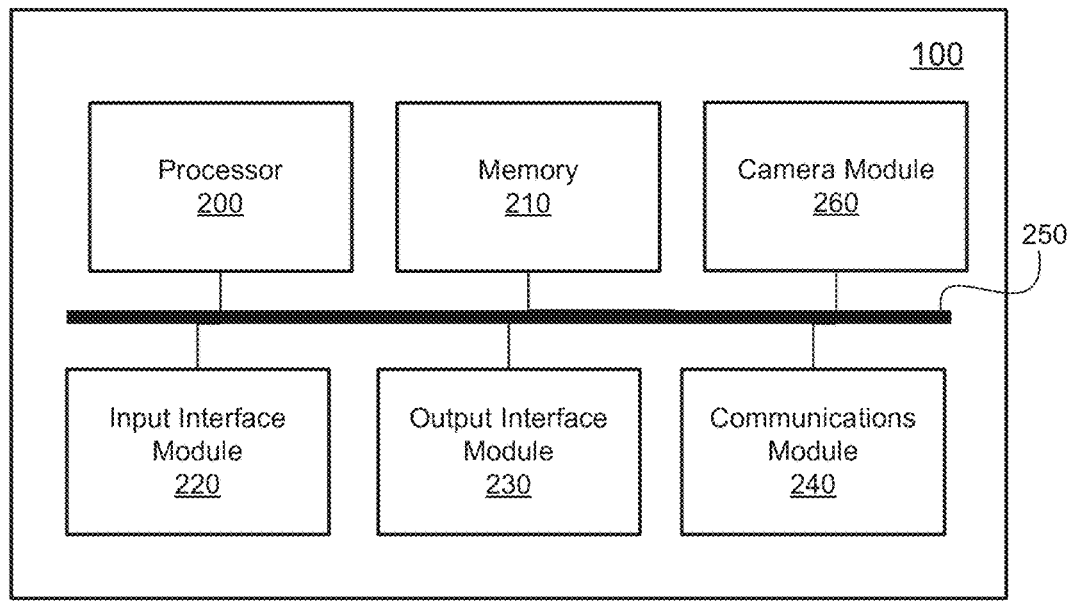
FIG. 2 is a high-level operation diagram of an example electronic device.

Returning to the electronic device 100, FIG. 2 is a high-level operation diagram of the electronic device 100. As will be discussed in greater detail below, the electronic device 100 includes image capture application software that allows a user to perform or control capturing images of a document.

The electronic device 100, a computing device, includes a variety of modules. For example, as illustrated, the electronic device 100, may include a processor 200, a memory 210, an input interface module 220, an output interface module 230, a communications module 240, and a camera module 260. As illustrated, the foregoing example modules of the electronic device 100 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the electronic device 100.

The input interface module 220 allows the electronic device 100 to receive input signals. Input signals may, for example, correspond to input received from a user. The input interface module 220 may serve to interconnect the electronic device 100 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the electronic device 100 to provide output signals. Some output signals may, for example allow provision of output to a user. The output interface module 230 may serve to interconnect the electronic device 100 with one or more output devices. Output signals may be sent to output devices by output interface module 230. Output devices may include, for example, a display screen such as, for example, a liquid crystal display (LCD), a touchscreen display. Additionally or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the electronic device 100 to communicate with other electronic devices and/or various communications networks. For example, the communications module 240 may allow the electronic device 100 to send or receive communications signals. Communications signals may be sent or received according to one or more protocols or according to one or more standards. For example, the communications module 240 may allow the electronic device 100 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the electronic device 100 to communicate using near-field communication (NFC), via Wi-Fi™, using Bluetooth™ or via some combination of one or more networks or protocols. For example, where the terminal 110 is a payment terminal such as a POS terminal, the electronic device 100 may communicate via the communications module 240 to effect contactless payments. Contactless payments may be made using NFC. In some embodiments, all or a portion of the communications module 240 may be integrated into a component of the electronic device 100. For example, communications module may be integrated into a communications chipset.

The camera module 260 allows the electronic device 100 to capture camera data such as images in the form of still photographs and/or motion video. The camera module 260 includes one or more cameras that are mounted on the electronic device 100. In particular, the electronic device 100 may include a display screen on a first side and at least one rear-facing camera on a second side opposite to the first side. The rear-facing cameras are located to obtain images of a subject near a rear side of the electronic device 100. The camera data may be captured in the form of an electronic signal which is produced by an image sensor associated with each of one or more of the cameras. In at least some embodiments, the electronic device 100 operates in an operating mode in which the display screen acts as a viewfinder displaying image data associated with the rear-facing cameras.

Software comprising instructions is executed by the processor 200 from a computer-readable medium. For example, software may be loaded into random-access memory from persistent storage of memory 210. Additionally or alternatively, instructions may be executed by the processor 200 directly from read-only memory of memory 210.

Figure 3:
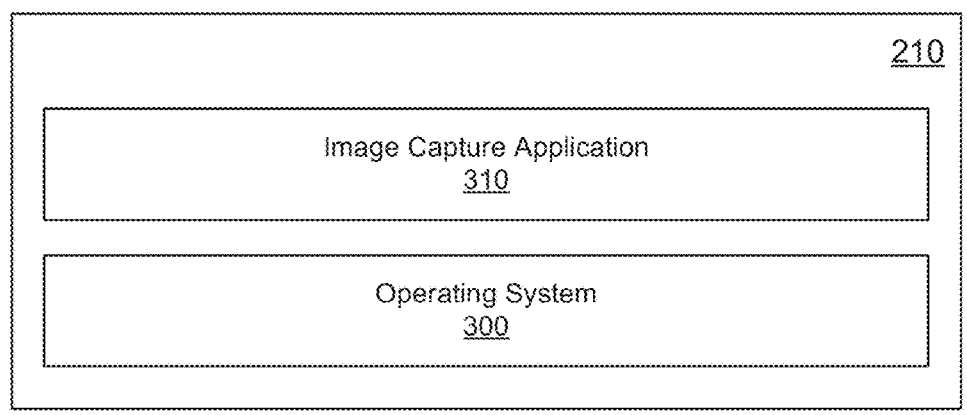
FIG. 3 depicts a simplified software organization of the example electronic device of FIG. 2.

FIG. 3 depicts a simplified organization of software components stored in memory 210 of the electronic device 100. As illustrated these software components include an operating system 300 and an image capture application 310.

The operating system 300 is software. The operating system 300 allows the image capture application 310 to access the processor 200, the memory 210, the input interface module 220, the output interface module 230 and the communications module 240. The operating system 300 may be, for example, Apple iOS™, Google™ Android™, Linux™, Microsoft™ Windows™, or the like.

The image capture application 310 adapts the electronic device 100, in combination with the operating system 300, to operate as a device capable of capturing image data. The image capture application 310 may be a stand-alone application or integrated into another application as a sub-function or feature. For example, the image capture application 310 may be a standard camera application which can be used to capture images and save, process, edit, and/or transmit the captured images. As another example, the image capture application 310 may be called as a sub-function by a financial application that is used for making cheque deposits or data transfers corresponding to financial data. In particular, the image capture application 310 may be part of a mobile banking application such as when the electronic device 100 is a mobile device. A mobile banking application may offer, as a feature, the ability to deposit a cheque into a user's various bank accounts (e.g. chequing account, savings account, etc.) by capturing image(s) of the cheque and uploading the image(s) to the bank's servers. In order to effect such data capture and upload, a mobile banking application may call the image capture application 310 when prompted by a user input to initiate a cheque deposit process.

The image capture application 310 may include one or more submodules.

Figure 4:
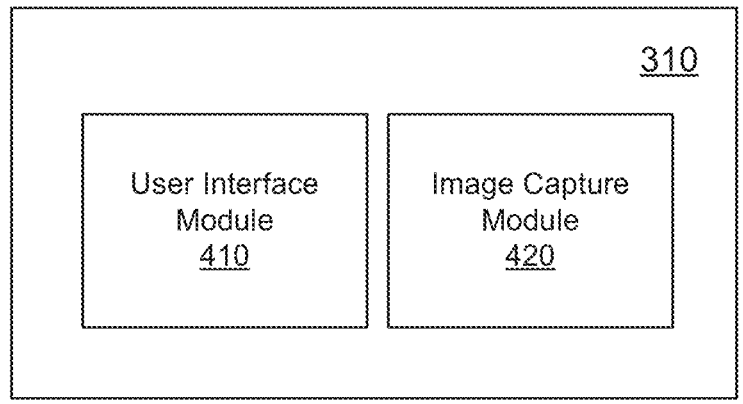
FIG. 4 depicts a simplified organization of software modules exemplary of an embodiment of an image capture application.

FIG. 4 depicts a simplified organization of submodules exemplary of an embodiment of the image capture application 310.

As illustrated, the image capture application 310 includes a user interface module 410 and an image capture module 420.

The user interface module 410 provides user interface for the image capture application 310. In some embodiments, the provided user interface may be visual and may include one or more screens or panels allowing a user to configure and control various aspects of the image capture application 310 and to otherwise review other information related to aspects of the image capture application 310. For example, a visual user interface may be provided using a display screen accessed via the output interface module 230 (FIG. 2). The user interface for the image capture application 310 may be provided as a viewfinder or a preview screen on the display screen of the electronic device 100. More specifically, when the image capture application 310 is launched, at least a portion of the display screen of the electronic device 100 may be occupied by a viewfinder or a preview screen which shows a live preview of a scene as captured by the camera module 260 of the electronic device 100.

The user interface module 410 may process input provided by a user such as may be received, for example, via the input interface module 220 (FIG. 2). For example, a user may provide input for processing by the user interface module 410 using an input device such as, for example, a touch display screen from which input is received. The input from the input device may be received via the input interface module 220.

Additionally or alternatively, the user interface module 410 may provide one or more other forms of user interface such as, for example, an audio-based interface which uses text-to-speech or voice recognition to interact with a user.

The image capture module 420 is responsible for initiating and controlling the capture and processing of images performed using the image capture application 310. The image capture module 420 may be configurable to support capturing and processing images of various different types of documents. For example, the image capture module 420 may support capturing images of identity documents, financial instruments, tickets, receipts, and various other documents containing printed material thereon.

Figure 5:
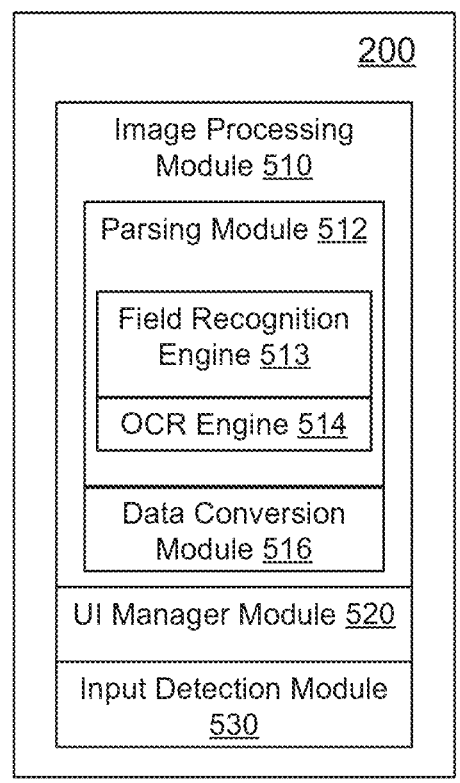
FIG. 5 depicts a simplified organization of components exemplary of an embodiment of a processor.

FIG. 5 depicts a simplified organization of components exemplary of an embodiment of the processor 200. As illustrated, the processor 200 includes an image processing module 510, a user interface (UI) manager module 520, and an input detection module 530. The image processing module 510 includes, at least, a parsing module 512, which contains a field recognition engine 513 and an OCR engine 514, and a data conversion module 516. Each of these components and their respective functions will be discussed in turn with reference to the method 600 in FIG. 6.

Figure 6:
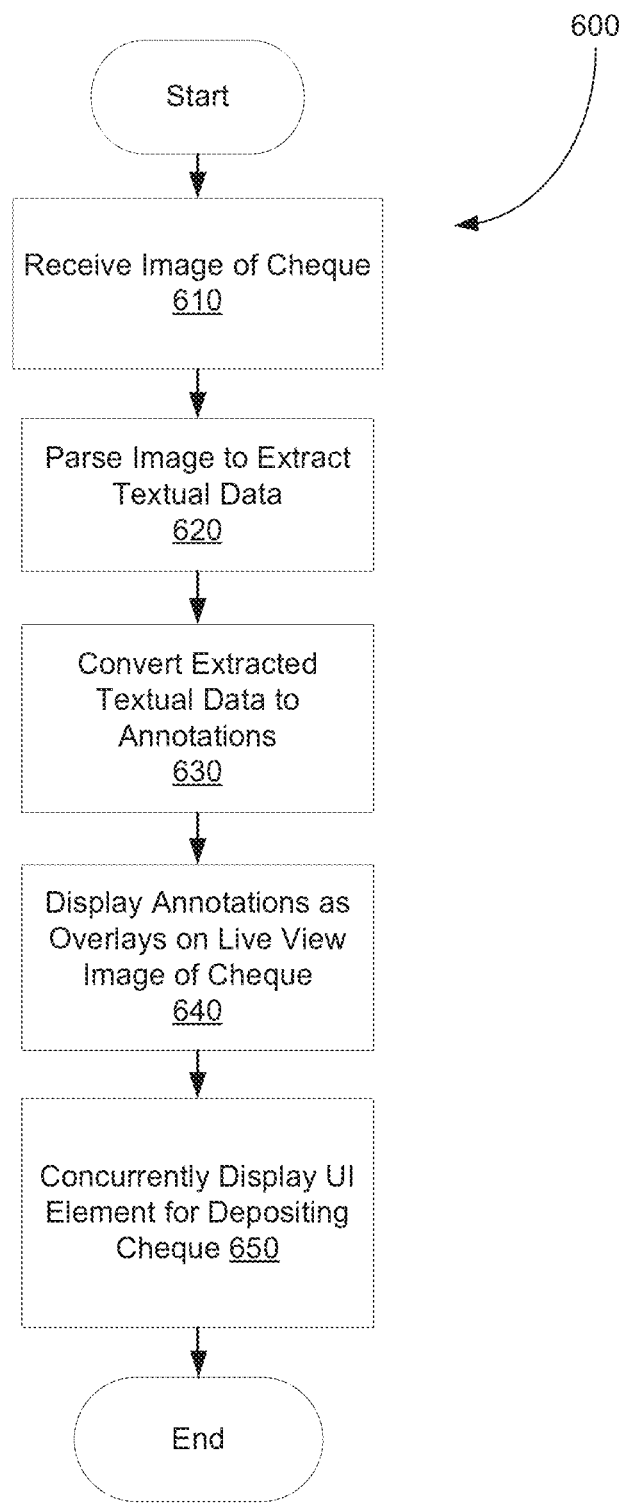
FIG. 6 is a flowchart depicting example operations performed by the image capture application of FIG. 3.

FIG. 6 shows, in flowchart form, an example method 600 for processing captured images of a document, in accordance with example embodiments of the present disclosure. The method 600 is implemented by a processor of a computing device, such as electronic device 100 of FIG. 1. Specifically, the method 600 may be implemented as part of the operations performed by an image capture application, such as application 310 of FIG. 3. Additionally or alternatively, the method 600 may be implemented by a banking application which is designed, at least, to accept mobile deposit of financial instruments, such as cheques.

When the image capture (or banking) application is launched by a user, an initial check may be performed to verify the association of the user with a user account at the corresponding financial institution. For example, the user may be prompted to input the user's bank account information and corresponding password to access the application. If, within the application, the user selects an option to deposit a cheque into a particular account, a further check may be performed to determine whether the user is enrolled in a mobile deposit program offered by the financial institution. If the user is not so enrolled, the user may be prompted to join the mobile deposit program such that the feature of remotely depositing cheques may be enabled for one or more of the user's bank accounts.

In operation 610, an image of the cheque is captured. That is, image data for an image of at least part of the cheque is acquired using at least one camera of the electronic device. The acquired image may capture the entirety of the cheque or only a portion of the cheque. In some embodiments, the processor may be configured to automatically recognize if an acquired image is that of a cheque. The image processing module 510 may implement one or more techniques for document image classification in operation 610. The imaged document may be classified as a cheque based on, for example, (local) image features, physical layout, logical structure, and/or textual features. For example, the acquired image may be processed by the image processing module 510 using, for example, pattern recognition (e.g. template matching), document layout analysis, and/or other algorithms, to determine that the document that is captured in the image is a cheque. The acquired image may be stored as a digital file in memory.

A cheque, as with various other standardized documents/instruments, contains a plurality of data fields and corresponding data entry items imprinted thereon. For example, a cheque may contain one or more of the following data fields: name of payer, address of payer, name of payee, cheque number, date, numeric dollar amount, written dollar amount, payer signature, bank branch address, payment description, bank transit number, bank institution code, and bank account number. In order for a cheque to be valid as a payment instrument, at least a subset of the data fields is required to be filled with corresponding data entry items. The data entry items may, for example, be made manually (e.g. written by cheque issuer) or machine-generated.

In operation 620, the acquired image of the cheque is processed by the parsing module 512 to extract one or more of the data entry items from the cheque. The acquired image may first be passed to the field recognition engine 513, which determines regions and boundaries of the acquired image that correspond to the various data fields of the cheque. The field recognition engine 513 may, for example, perform a layout analysis by segmenting the cheque image into regions having homogeneous content and assigning a logical meaning (e.g. association with a data field) to each of the regions. Additionally or alternatively, the field recognition engine 513 may employ a template matching technique to identify feature matches between the acquired image and bank cheque image templates. Specifically, template matching can be used to identify regions of the acquired image that match data field labels and their neighboring regions in one or more bank cheque image templates. By way of example, in some embodiments, the acquired image may be compared to one or more static bank cheque templates, in order to identify specific matches of data fields. A data field in the acquired image of the cheque may be identified by detecting a match with a data field in one of the templates based on, for example, dimensions/shape of the data field, text or graphics label associated with the data field, and/or relative location of the data field on the imaged cheque.

Once the data field boundaries (and, accordingly, the corresponding data field regions) on the acquired image are identified, the image is further processed by the optical character recognition (OCR) engine 514. The OCR engine 514 is capable of converting images of typed, handwritten, or printed text into digital format, such as machine-encoded text. The OCR engine 514 detects an image representation of a data entry item in a particular data field region and converts the image representation into text format. In this way, the text associated with the data entry items represented in the acquired image of the cheque can be extracted.

In some embodiments, the OCR engine 514 may be used in identifying data fields on the acquired image of the cheque, in operation 620. In particular, the text content of the data entry item that is detected by the OCR engine 514 may indicate or suggest the corresponding data field. For example, if the detected text of a data entry item reads "One Hundred and Fifty Dollars", the corresponding data field may be presumed to be an "Amount" field. In some embodiments, the OCR engine 514 may even be configured to detect and convert data field labels into text, which would facilitate identifying the data fields. For example, the OCR engine 514 may read "To:" and assign the associated data field as a "Receiver" field; similarly, the OCR engine 514 may detect the phrase "In the Amount of:" in the acquired image and determine that the associated data field (e.g. a blank space immediately adjacent to the data label) corresponds to the "Amount" field. These techniques of "dynamically" identifying data fields by the OCR engine 514 may be combined with static template matching methods in some instances. For example, the information obtained by the OCR engine 514 may be used to verify, or weight a level of confidence, that the identification of data fields by means of static template matching/comparison is correct.

In operation 630, the extracted text of the data entry items is converted into graphical user interface elements for display on the display screen of the electronic device. Specifically, the data conversion module 516 may convert the extracted data entry items into user interface items that can be suitably presented as annotations on the display screen. In operation 640, the annotations are displayed as overlays on a live view image of the cheque on the display screen. In particular, the UI manager module 520 takes camera input (i.e. live preview of scene captured by camera) and the annotations generated from the extracted data entry items to produce display output. Thus, the displayed output contains a live view image of the cheque as well as one or more annotation overlays positioned over the live view image.

The annotation overlays, generated from the text of the data entry items on the cheque, are displayed in association with representations of their respective corresponding data fields in the live view image. That is, the annotations are arranged on the live view image of the cheque such that each annotation is displayed as being associated with a particular data field. The association may, for example, be a physical association (e.g. proximity to image of corresponding data field) or a logical association (e.g. arrows connecting annotations to images of their corresponding data fields).

In operation 650, a user interface element that is selectable to update one or more records in a remote database is displayed concurrently with the live view image of the cheque. User selection of the displayed UI element may initiate update of a database record using the data entry items extracted from the acquired image of the cheque. The UI element may, for example, correspond to a cheque "deposit" functionality. In particular, responsive to a selection of the UI element, at least a subset of the extracted data entry items may be transmitted to a remote server (which represents a financial institution such as a bank) in association with their corresponding data fields. The transmitted data can, in turn, be used by the financial institution to initiate a transfer of funds from an account of the cheque issuer to one of the user's (i.e. cheque payee's) account.

Figure 7A:
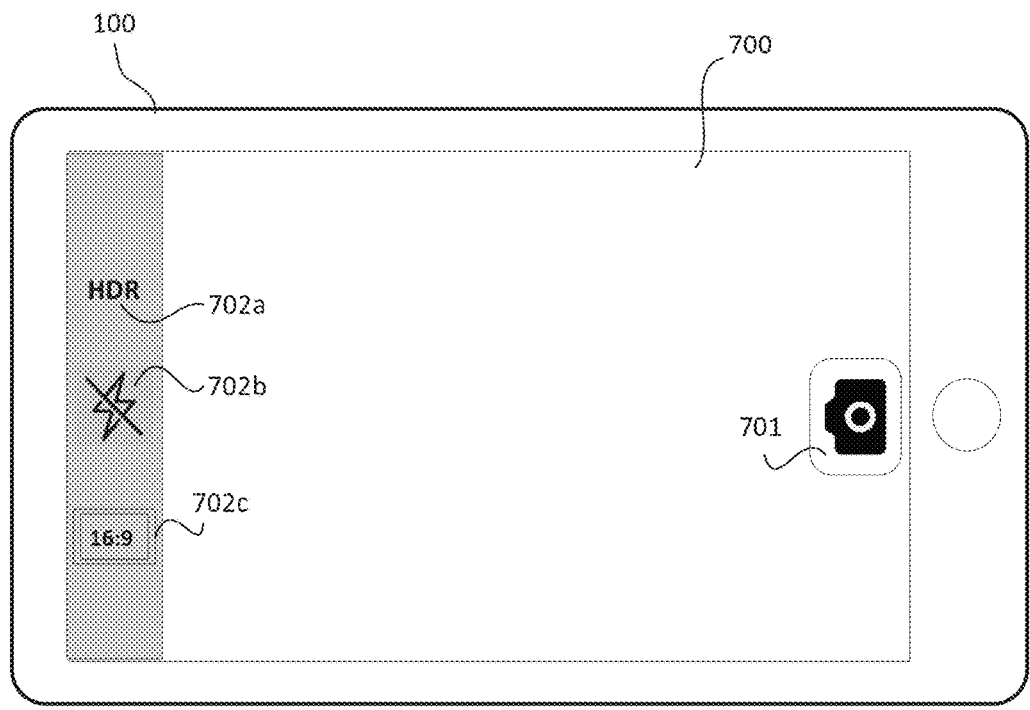
FIGS. 7A-7E show example user interface screens of the image capture application of FIG. 3.
Figure 7B:
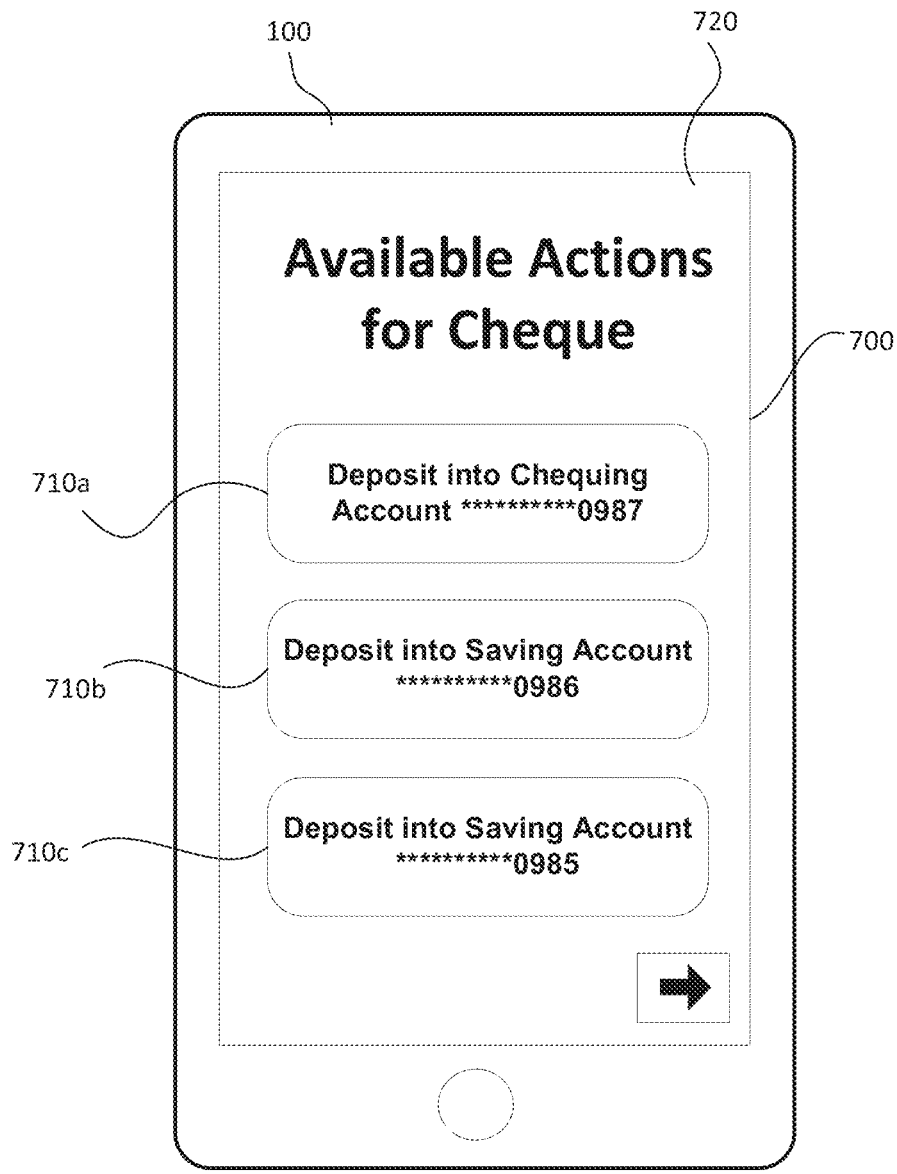

Reference is now made to FIGS. 7A-7E, which show an example user interface 700 of a mobile banking application on an electronic device 100, in accordance with embodiments of the present disclosure. FIG. 7A shows a live image/preview screen on the user interface 700, which includes a capture button 701 and a plurality of options 702a, 702b, and 702c, which may be modified or toggled. In FIG. 7B, the user interface 700 shows a landing screen 720 for a mobile cheque deposit feature of the banking application. The screen 720 presents the actions that are available for the user in managing a cheque using the banking application. The options 710a, 710b, and 710c correspond to different bank accounts of the user into which a cheque can be deposited. Upon selection, by the user, of one of the available options 710a, 710b, and 710c, the banking application proceeds to an image capture (i.e. preview) screen in which a live view image of the cheque is displayed. As part of the pre-imaging process, the user may additionally have the option of indicating an amount (and currency) of funds to deposit into the selected bank account.

Figure 7C:
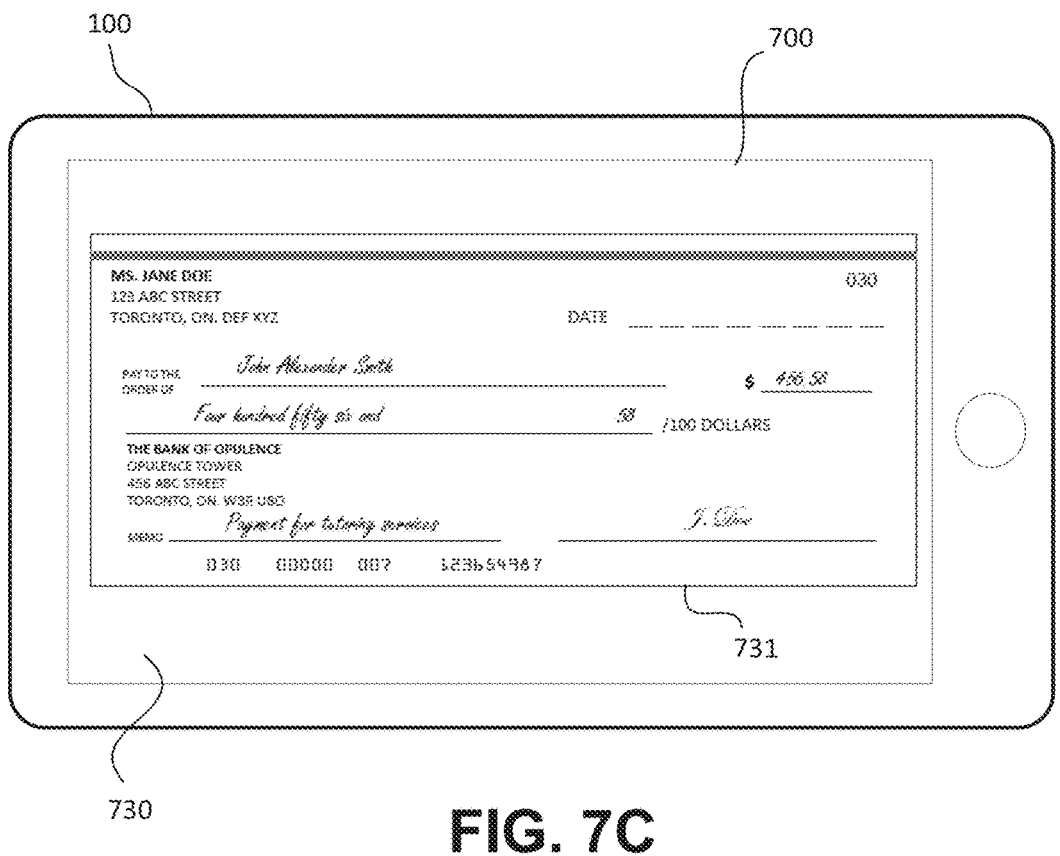
Figure 7D:
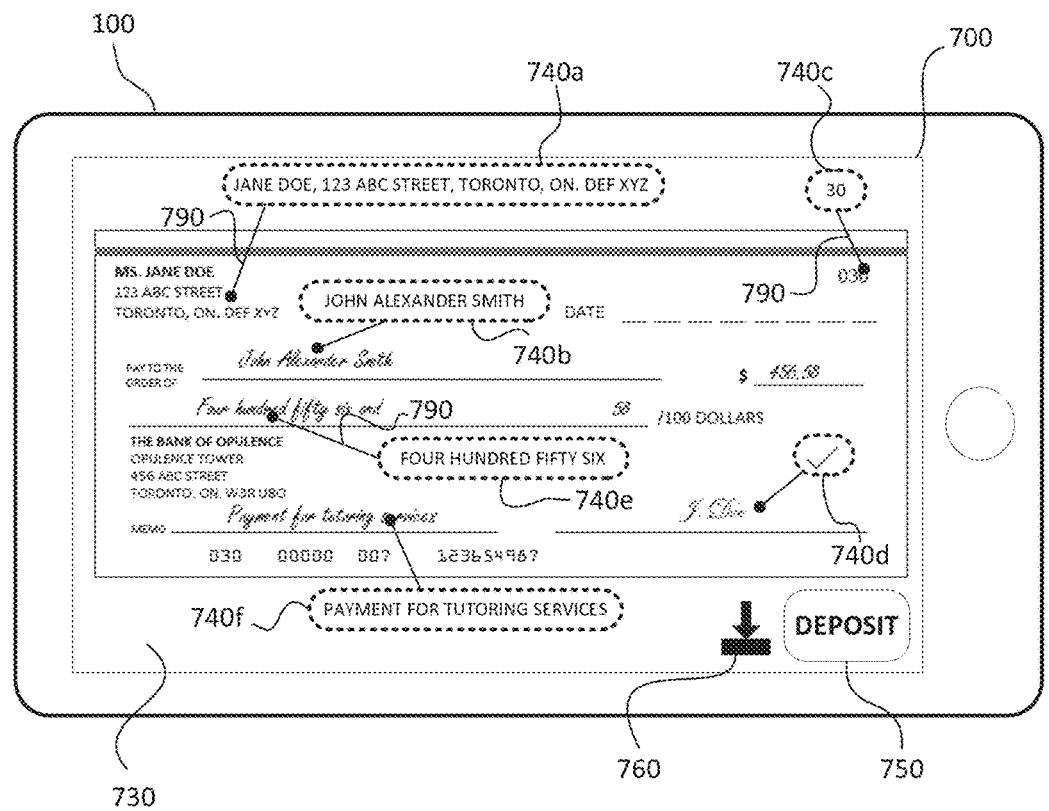

FIG. 7C shows an image capture screen 730 which displays a preview/live view image 731 of a cheque. FIG. 7D shows the live view image 731 of the cheque as well as annotation overlays 740a, 740b, 740c, 740d, 740e, and 740f corresponding to data entry items extracted from an acquired image of the cheque. As illustrated in FIG. 7D, the extracted data entry items are shown as independent annotation overlays. In particular, in some embodiments, each annotation overlay may be in the form of an editable user interface element. Each annotation may, for example, be a text field that is manually editable and/or movable. The user can select a particular annotation to edit. Upon selection, the displayed live view image may be fixed on the screen (to prevent possible updating of the annotations due to movement of the camera). Once the user has completed manually editing the annotation, the user can return to the live view image mode. In some cases, an annotation that has been manually edited may become fixed and non-editable (e.g. grayed out) to indicate that the annotation contains user-provided data.

In some embodiments, the data entry items corresponding to more important data fields may be highlighted or emphasized in their display on the screen 730. For example, the annotations that are associated with data fields which are necessary for a cheque to be deposited may be shown in a different colour, bolded, or in different sizes.

As shown in FIG. 7D, the overlay annotations 740a-740f are placed over the live view image of the cheque. In at least some embodiments, an annotation overlay associated with an extracted data entry item is positioned in spaced relation to a representation of the data entry item (i.e. actual text) on the live view image. For example, one or more of the annotations may be positioned in spaced relation to their corresponding data entry text, with graphical indications of their association. In some embodiments, the one or more annotations may be positioned so that perceptual constancy of their spatial locations relative to corresponding data entry text is maintained. In FIG. 7D, lines 790 are shown connecting annotation overlay items with representations of their corresponding text data entries on the live view image. In some embodiments, the annotation overlays may be displayed in association with their respective corresponding data fields. For example, annotation overlays may be positioned in predetermined regions (e.g. neighboring/adjacent regions) of the live view image that are associated with their respective corresponding data fields. These predetermined regions may be defined by boundaries surrounding the representations of the data fields on the live view image. For example, the predetermined regions may be defined by boundaries of geometrical shapes (e.g. rectangle, square, etc.) of defined dimensions surrounding the location of the data entry field label and/or entry space/cell.

The preview screen 730 of FIG. 7D also shows a user interface element 760 corresponding to a "save" option and a user interface element 750 for initiating a deposit process for the imaged cheque, both of which may be concurrently displayed with the live view image of the cheque. The "save" option may allow an imaged cheque and its associated data (e.g. extracted data entries, etc.) to be stored in memory of the electronic device 100. The UI element 750 is selectable to transmit extracted data entry items to a remote bank server, triggering the process of depositing the cheque (i.e. transfer of funds between specified bank accounts). In some embodiments, a further user interface element may be displayed concurrently with the live view image of the cheque, for confirming that the information contained in the annotations is correct. For example, such UI element for confirming the correctness of data in the annotations may be displayed prior to the "save" or "deposit" UI elements 760 and 750, respectively.

Once they are displayed over the live view image of the cheque, the annotation overlays may be fixed in position relative to one or both of the data field label and actual text of the corresponding data entries. That is, the overlays may "move" responsive to movement of the live view image of the cheque on the preview screen 730. In this way, the physical and logical association of the overlays with their respective data fields and/or original text entries can be maintained while the live view image of the cheque is displayed on the screen 730 and dynamically. In some instances, the annotations may also shrink, expand, or remain constant in size relative to the size of the text on the actual cheque to adjust for the various viewing angles and distances.

Figure 7E:
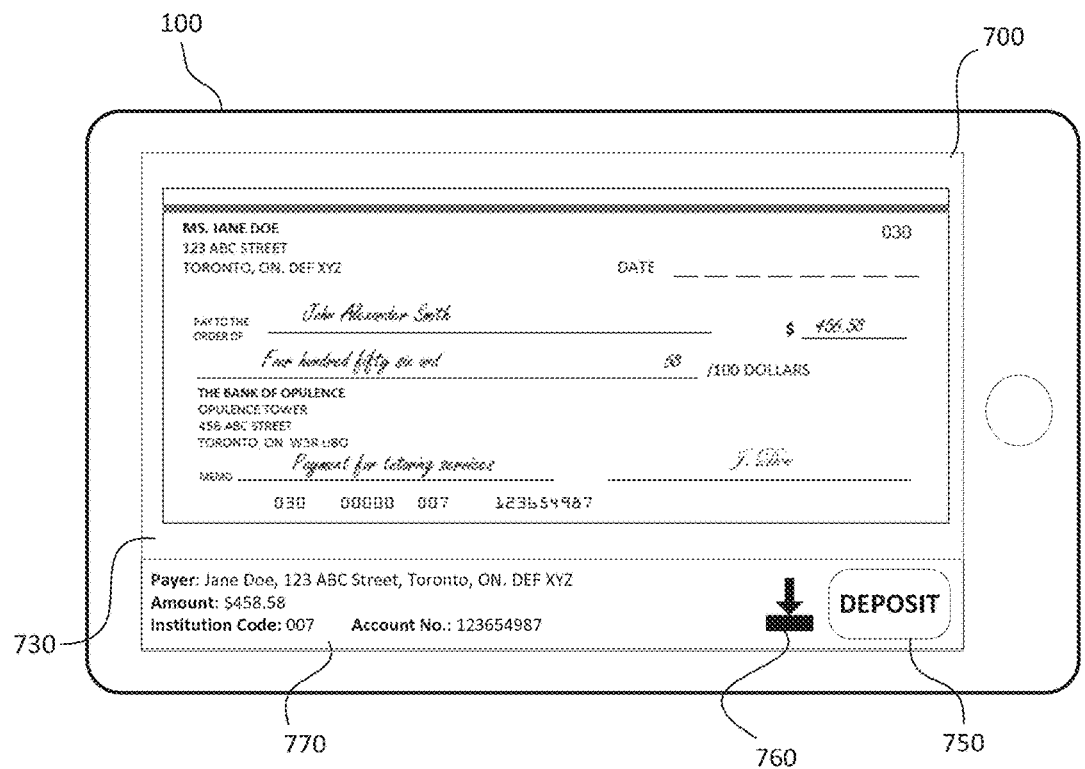

In some embodiments, the banking application may be configured to display, in the preview screen 730, a sidebar which summarizes the extracted data entry items from the imaged cheque. FIG. 7E shows an example sidebar 770. The sidebar 770 may be displayed, for example, in response to recognition of the live view image as an image of a cheque. The sidebar 770 may list all of the extracted data entry items, and display UI elements 760 and 750 for saving the cheque image and associated information or depositing the imaged cheque, respectively.

The variability of image quality of the acquired images of cheques may pose a challenge for the process of annotating live view images of cheques. In some embodiments, if an acquired image is too small, the user may be prompted to capture a bigger image of the cheque, and overlay annotations may not be displayed until a sufficiently large image is acquired/presented on the camera preview screen. As explained above, the annotation overlays are displayed independently, and may be displayed at different times, in different orders, etc. as each data entry item of the imaged cheque becomes recognized. That is, the display of annotation overlays may be updated in real-time, for example, with movement of the camera of the electronic device. In some cases, the UI elements corresponding to the "confirm" (i.e. confirming correctness of annotated data) and "deposit" (i.e. depositing the cheque) options may not be displayed, or may not be actuatable, until a sufficient number of required data fields is shown as overlaid on the live view image of the cheque.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An electronic device comprising:
   a display;
   a camera;
   a memory storing an image capture application module; and
   a processor coupled to the display, the camera and the memory, the processor being configured to:
   receive an image of at least part of a document captured by the camera, the document having one or more data fields;
   determine, from the image, one or more data entry items representing content of the one or more data fields; and
   display, on the display, a live view image of the document with annotation overlays on the live view image, each annotation overlay containing a respective one of the one or more data entry items and being displayed in association with its respective data field in the live view image.

2. The electronic device of claim 1, wherein the processor is further configured to display, on the display, a first user interface element for initiating a first action using the one or more data entry items, the first user interface element being displayed concurrently with the live view image of the document.

3. The electronic device of claim 2, wherein the processor is further configured to:
   receive a selection of the first user interface element; and
   in response to receiving the selection of the first user interface element, transmit, to a remote server, at least a subset of the one or more data entry items in association with respective corresponding data fields.

4. The electronic device of claim 1, wherein determining the one or more data entry items comprises:
   identifying regions of the image corresponding to the one or more data fields;
   for each of the identified regions:
   detecting an image representation of a data entry item in the identified region; and
   converting the image representation of the data entry item to text format.

5. The electronic device of claim 4, wherein converting the image representation of the data entry item to text format comprises processing the image representation of the data entry item using optical character recognition.

6. The electronic device of claim 1, wherein one or more of the annotation overlays on the live view image comprise editable text fields.

7. The electronic device of claim 1, wherein the annotation overlays associated with the one or more data entry items are positioned in predetermined regions of the live view image associated with the respective corresponding data fields.

8. The electronic device of claim 7, wherein a predetermined region of the live view image associated with a data field is defined by boundaries surrounding a representation of the data field on the live view image.

9. The electronic device of claim 1, wherein an annotation overlay associated with a first one of the one or more data entry item is positioned in spaced relation to a representation of the first one data entry item on the live view image.

10. The electronic device of claim 1, wherein the processor is configured to automatically detect a type associated with the document and wherein the displaying the live view image of the document is performed in response to detecting that the document is of a first type.

11. A computer-implemented method, comprising:
    capturing an image of at least part of a document by a camera of an electronic device, the document having one or more data fields;
    determining, by the electronic device, from the image one or more data entry items representing content of the one or more data fields; and
    displaying, on a display of the electronic device, a live view image of the document with annotation overlays on the live view image, each annotation overlay containing a respective one of the one or more data entry items and being displayed in association with its respective data field in the live view image.

12. The method of claim 11, further comprising displaying, on the display, a first user interface element for initiating a first action using the one or more data entry items, the first user interface element being displayed concurrently with the live view image of the document.

13. The method of claim 12, further comprising:
    receiving a selection of the first user interface element; and
    in response to receiving the selection of the first user interface element, transmitting, to a remote server, at least a subset of the one or more data entry items in association with respective corresponding data fields.

14. The method of claim 11, wherein determining the one or more data entry items comprises:
    identifying regions of the image corresponding to the one or more data fields;
    for each of the identified regions:
    detecting an image representation of a data entry item in the identified region; and
    converting the image representation of the data entry item to text format.

15. The method of claim 14, wherein converting the image representation of the data entry item to text format comprises processing the image representation of the data entry item using optical character recognition.

16. The method of claim 11, wherein one or more of the annotation overlays on the live view image comprise editable text fields.

17. The method of claim 11, wherein the annotation overlays associated with the one or more data entry items are positioned in predetermined regions of the live view image associated with the respective corresponding data fields.

18. The method of claim 17, wherein a predetermined region of the live view image associated with a data field is defined by boundaries surrounding a representation of the data field on the live view image.

19. The method of claim 11, wherein an annotation overlay associated with a first one of the one or more data entry item is positioned in spaced relation to a representation of the first one data entry item on the live view image.

20. A non-transitory computer-readable storage medium comprising processor-executable instructions which, when executed, configure a processor to:
- receive an image of at least part of a document captured by a camera of an electronic device, the document having one or more data fields;
- determine, from the image, one or more data entry items representing content of the one or more data fields in the image; and
- display, on a display of the electronic device, a live view image of the document with annotation overlays on the live view image, each annotation overlay containing a respective one of the one or more data entry items and being displayed in association with its respective data field in the live view image.

* * * * *